United States Patent [19]

Katayama

[11] Patent Number: 5,537,496
[45] Date of Patent: Jul. 16, 1996

[54] METHOD OF ANY APPARATUS FOR CONVERTING GRADIENT OF IMAGE DATA

[75] Inventor: Takeshi Katayama, Kanagawa-ken, Japan

[73] Assignee: Fuji Photo Film Co., Ltd., Kanagawa, Japan

[21] Appl. No.: 467,868

[22] Filed: Jun. 6, 1995

Related U.S. Application Data

[63] Continuation of Ser. No. 228,554, Apr. 15, 1994, abandoned.

[30] Foreign Application Priority Data

Apr. 16, 1993 [JP] Japan .................... 5-089965

[51] Int. Cl.$^6$ .................... G06K 9/38
[52] U.S. Cl. .................... 382/272; 382/254; 382/270; 358/455
[58] Field of Search .................... 382/173, 266, 382/274, 254, 270, 272, 273; 358/445

[56] References Cited

U.S. PATENT DOCUMENTS

| | | | |
|---|---|---|---|
| 4,757,552 | 7/1988 | Asano et al. | 382/54 |
| 5,038,223 | 8/1991 | Yamada | 382/266 |
| 5,101,452 | 5/1992 | Tsai et al. | 382/50 |
| 5,123,059 | 6/1992 | Hirosaw et al. | 382/52 |
| 5,125,045 | 6/1992 | Murakawi et al. | 382/50 |
| 5,159,470 | 10/1992 | Ishida et al. | 382/50 |

FOREIGN PATENT DOCUMENTS 1123373 5/1989 Japan .................... G06F 15/68

Primary Examiner—Jose L. Uso
Assistant Examiner—Anh Hong Do
Attorney, Agent, or Firm—Sughrue, Mion, Zinn, Macpeak & Seas

[57] ABSTRACT

A gradient conversion table is supplied with N-bit input image data and outputs M-bit image data, and a random-number generator outputs K-bit random-number data ($M \geq K$). An adder adds the K-bit random-number data to low-order K bits of the M-bit image data outputted from the gradient conversion table, and outputs high-order L bits $\{L>(M-K)\}$ of the sum as output image data. Low-order bits of the output image data are dispersed to produce an image with any banding of low visibility.

19 Claims, 9 Drawing Sheets

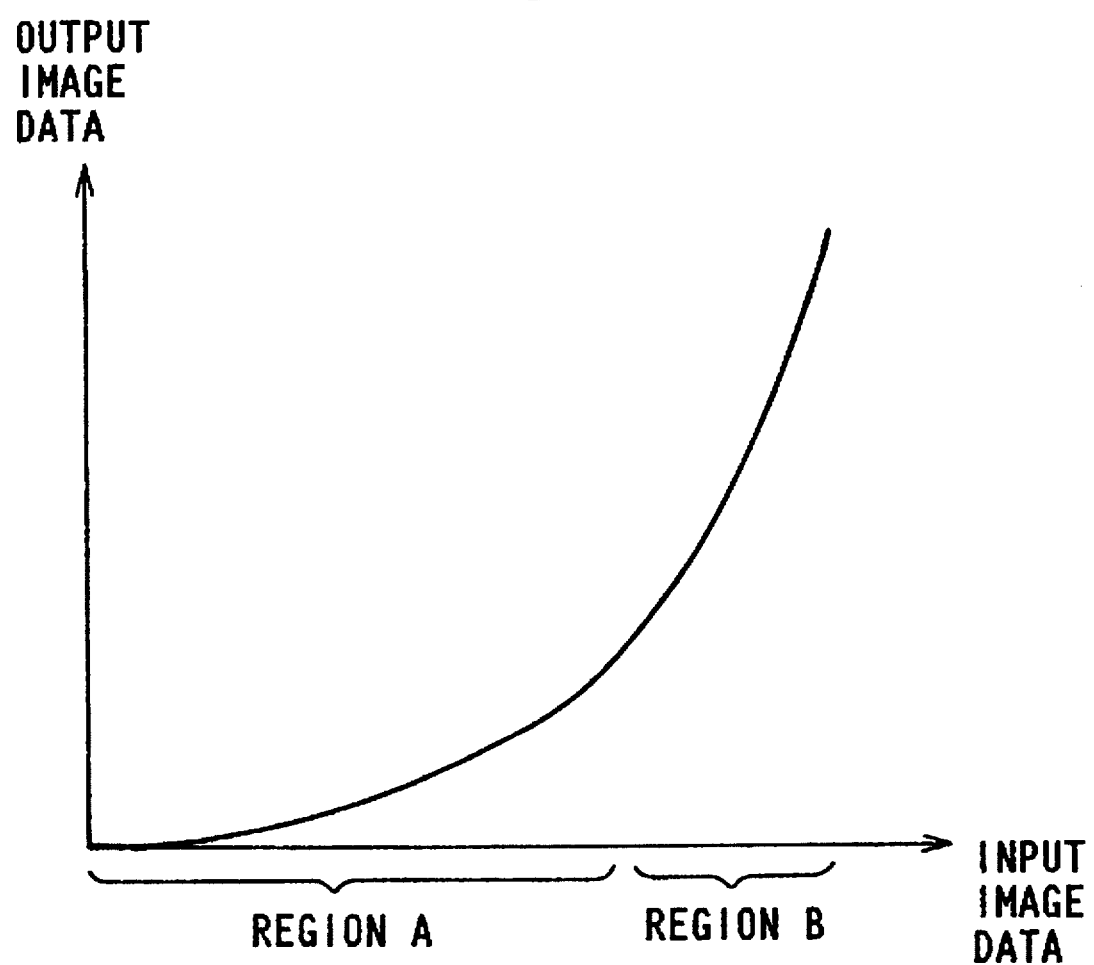

FIG.11A

| INPUT IMAGE DATA | 0 | 1 | 2 | 3 | 4 | 5 | 6 | 7 | 8 | 9 | 10 |
|---|---|---|---|---|---|---|---|---|---|---|---|
| OUTPUT IMAGE DATA AFTER BEING CONVERTED | 0 | 1 | 1 | 2 | 3 | 4 | 4 | 5 | 6 | 6 | 7 | ... |
| | 0 | 1 | 1 | 2 | 3 | 4 | 4 | 5 | 6 | 6 | 7 | ... |
| | 0 | 1 | 1 | 2 | 3 | 4 | 4 | 5 | 6 | 6 | 7 | ... |
| | 0 | 1 | 1 | 2 | 3 | 4 | 4 | 5 | 6 | 6 | 7 | ... |

FIG.11B

| INPUT IMAGE DATA | 0 | 1 | 2 | 3 | 4 | 5 | 6 | 7 |
|---|---|---|---|---|---|---|---|---|
| OUTPUT IMAGE DATA AFTER BEING CONVERTED | 0 | 1 | 3 | 4 | 6 | 7 | 9 | 10 | ... |
| | 0 | 1 | 3 | 4 | 6 | 7 | 9 | 10 | ... |
| | 0 | 1 | 3 | 4 | 6 | 7 | 9 | 10 | ... |
| | 0 | 1 | 3 | 4 | 6 | 7 | 9 | 10 | ... |

METHOD OF ANY APPARATUS FOR CONVERTING GRADIENT OF IMAGE DATA

This application is a continuation of U.S. patent application Ser. No. 08/228,554, filed Apr. 15, 1994, now abandoned.

BACKGROUND OF THE INVENTION

1. Field of the Invention

The present invention relates to a method of and an apparatus for converting the gradient of image data to produce output image data from input image data, in which visibility of banding is improved.

2. Description of the Related Art

Image data that are produced by an image input device such as an image scanner or the like are finally outputted as a visible image from an image output device. For outputting such image data as a visible image, it is necessary to calibrate the image data because the image output characteristics of the image output device generally vary from device to device, or depending on the type of the image output device.

FIG. 10 of the accompanying drawings shows a gradient conversion table for converting input image data to output image data. The converted, i.e., calibrated, output image data in a region A are shown in FIG. 11A of the accompanying drawings, whereas the converted or calibrated output image data in a region B are shown in FIG. 11B of the accompanying drawings. The calibrated output image data in these regions A, B are plotted respectively in FIGS. 12A and 12B of the accompanying drawings.

When output image data are thus calibrated, no smooth conversion may be effected between the input and output image data, resulting in so-called banding or a density jump. Stated otherwise, when 8-bit input image data having 256 density steps are converted into 8-bit output image data, for example, the 256 density steps may not virtually be obtained.

According to one known solution disclosed in Japanese laid-open patent publication No. 1-123373, N-bit image data are gradient-converted to M-bit image data (N< M), and the image data of the decimal part (low-order (M−N) bits) of the M-bit image data are compared with (M−N)-bit random-number data. If the image data are larger than the random-number data, then "1" is added to the least significant bit of the integral part of the M-bit image data, and the resultant image data are outputted to produce an image with a banding of reduced visibility.

However, since only the least significant bit of the M-bit image data is controlled, any banding is not sufficiently improved. If the banding is large, the image data may not fully been calibrated.

Where a halftone-dot image is to be produced from 8-bit input image data having 256 density steps by an image output device, the number of density steps of the halftone-dot image depends on the resolution and screen ruling of the image output device. For example, if the resolution is 1,200 dots/inch (dpi) and the screen ruling is 100 lines/inch, then since one halftone dot is composed of 144 (12×12) dots, only 144 density steps can be produced even if the output image data are of 8 bits. In this case, the calibration of image data according to the above conventional process fails to reduce the visibility of the banding sufficiently since the scattering effect produced by the random number is poor, even though it is possible to obtain 256 density steps in the output image data.

Further, the aforementioned conventional art does not teach that when N-bit input image data having a number of density step "a" is gradient converted to M-bit image data (N<M), the number of density steps is converted to "b" which is different from the number of density step "a" of the input image data (a≠b) depending on a resolution and a screen ruling of an image output device, and at the same time, the number of density step "a" of the input image data is substantially secured in the output image data.

SUMMARY OF THE INVENTION

It is therefore an object of the present invention to provide a method of and an apparatus for converting the gradient of image data so as to produce an output image with banding of low visibility and increase the apparent number of density steps of the output image.

According to the present invention, the above object can be achieved by a method of converting the gradient of image data, comprising the steps of converting N-bit input image data having a number of density steps A to M-bit image data; processing the M-bit image data with K-bit random-number data (M≧K) with an integral part to produce image data; and extracting high-order L bits {L>(M−K)} of the produced image data as output image data having a number of density steps a which is equal to the number of density steps A of the input image data, or a number of density steps B which is different from the number of density steps A of the input image data.

According to the present invention, the above object can also be achieved by an apparatus for converting the gradient of image data, comprising storage means for holding a gradient conversion table for converting N-bit input image data having a number of density steps A to M-bit image data; random-number generating means for generating K-bit random-number data (M≧K) with an integral part; and processing means for processing the M-bit image data with the K-bit random-number data to produce image data and extracting high-order L bits {L>(M−K)} of the produced image data as output image data having a number of density steps A which is equal to the number of density steps A of the input image data, or a number of density steps B which is different from the number of density steps A of the input image data.

With the above method and apparatus, as shown in FIG. 4, N-bit input image data are converted to M-bit image data by the gradient conversion table, and the M-bit image data are processed by the K-bit random-number data (M≧K) with an integral part. High-order L bits {L>(M−K)} of the produced image data are outputted as output image data to produce an image. Since low-order (L−M+K) bits of the L-bit image data are directly affected by the K-bit random number data having an integral part, the banding is diluted by the scattering effect of the random number.

According to the present invention, the above object can also be achieved by a method of converting the gradient of image data, comprising the steps of converting N-bit input image data having a number of density steps A to M-bit image data; processing the M-bit image data with K-bit random-number data (M>K) without an integral part to produce image data; and extracting high-order L bits {L=(M−K)} of the produced image data as output image data having a number of density steps B which is different from the number of density steps A of the input image data.

According to the present invention, the above object can also be achieved by an apparatus for converting the gradient of image data, comprising storage means for holding a gradient conversion table for converting N-bit input image data having a number of density steps A to M-bit image data; random-number generating means for generating K-bit random-number data (M>K) without an integral part; and processing means for processing the M-bit image data with the K-bit random-number data to produce image data and extracting high-order L bits {L=(M−K)} of the produced image data as output image data having a number of density steps B which is different from the number of density steps A of the input image data.

With the above method and apparatus, as shown in FIG. 6, N-bit input image data having a number of density steps A are converted to M-bit image data by the gradient conversion table, and the M-bit image data are processed by the K-bit random-number data (M>K). High-order L bits {L=(M−K)} of the produced image data are outputted as output image data having a number of density steps B (A≠B) to produce an image. Since a gradient contained in low-order K bits of the M-bit image data is added to the least significant bit of the L-bit output image data by the random-number data and a smooth change in the density steps is realized, any banding is lowered in visibility, and the apparent number of density steps is increased.

According to the present invention, the above object can also be achieved by a method of converting the density steps of image data, comprising the steps of converting N-bit input image data having a number of density steps A to M-bit image data; processing the M-bit image data with K-bit random-number data (M≧K) having an integral part to produce image data; and extracting high-order L bits {L>(M− K)} of the produced image data as output image data having a number of density steps B which is different from the number of density steps A of the input image data.

According to the present invention, the above object can also be achieved by an apparatus for converting the density steps of image data, comprising storage means for holding a gradient conversion table for converting N-bit input image data having a number of density steps A to M-bit image data; random-number generating means for generating K-bit random-number data (M≧K) with an integral part; and processing means for processing said M-bit image data with the K-bit random-number data to produce image data and extracting high-order L bits {L>(M−K)} of the produced image data as output image data having a number of density steps B which is different from the number of density steps A of the input image data.

With the above method and apparatus, as shown in FIG. 8, N-bit input image data having a number of density steps A are converted to M-bit image data by the density steps conversion table, and the M-bit image data are processed by the K-bit random-number data (M≧K). High-order L bits {(L>(M−K)} of the produced image data are outputted as output image data having a number of density steps B (A≠B) to produce an image. Since low-order (L−M+K) bits of the L-bit image data are processed by the random-number data, and a gradient contained in low-order (M− L) bits of the M-bit image data is added by the random-number data and a smooth change in the density steps is realized, the intensity of banding is improved in a wide gradient range, and the apparent number of density steps is increased.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 10 is a diagram showing a gradient conversion table;

FIGS. 11A and 11B are diagrams showing the relationship between input and output image data according to a conventional process.

DETAILED DESCRIPTION OF THE PREFERRED EMBODIMENTS

Figure 2:
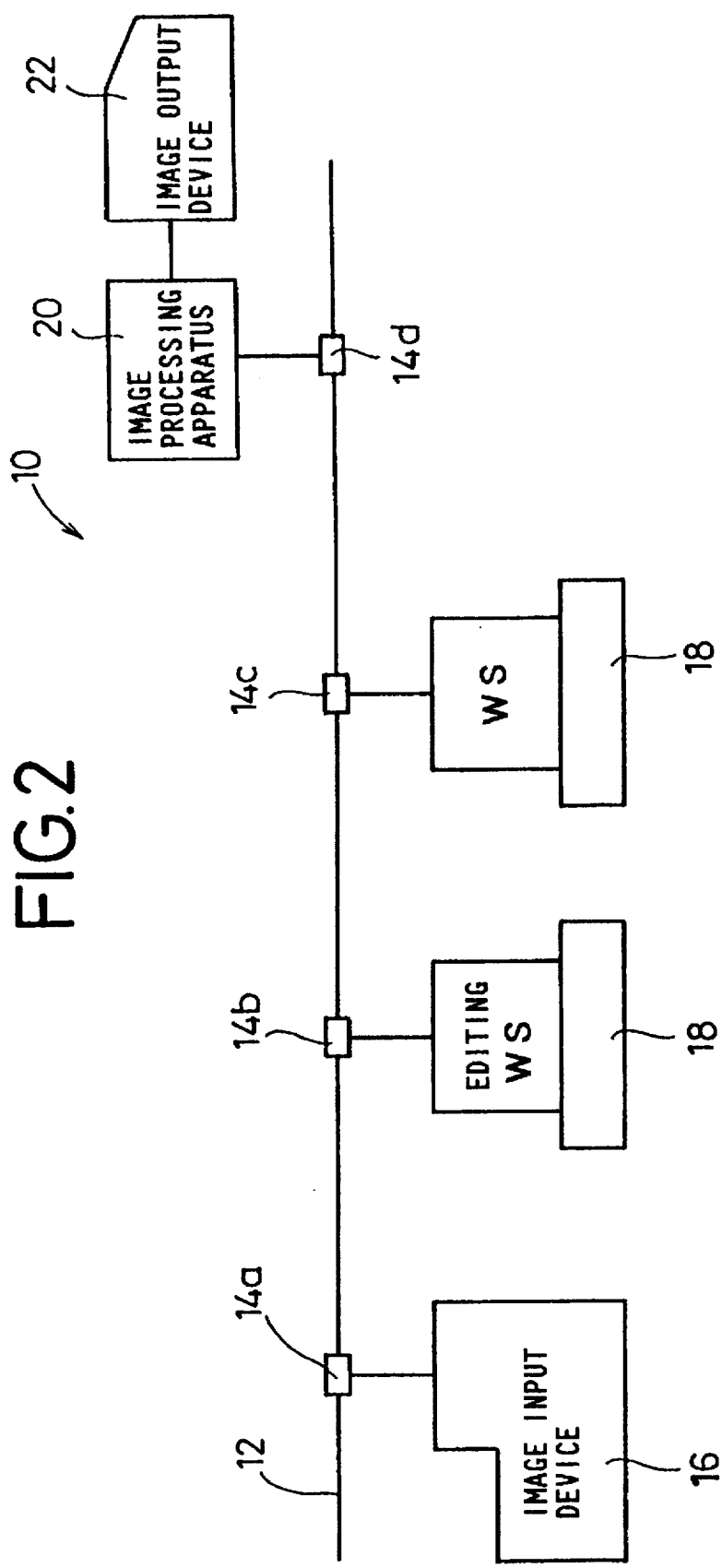
FIG. 2 is a block diagram of an image processing system which includes the image processing apparatus illustrated in FIG. 1.

As shown in FIG. 2, an image processing system 10 for inputting, editing, and outputting images generally includes a network 12 having a plurality of nodes 14a, 14b, 14c, 14d, an image input device 16 connected to the node 14a, a pair of editing workstations 18 connected to the nodes 14b, 14c, respectively, an image processing apparatus 20 which incorporates an apparatus for converting the gradient of image data according to the present invention, the image processing apparatus 20 being connected to the node 14d, and an image output device 22 connected to the image processing apparatus 20.

The image input device 16 reads image information from a document or the like to produce input image data, and supplies the input image data through the nodes 14a, 14b or 14c to one of the editing workstations 18. The editing workstation 18 processes the supplied input image data based on various conditions for generating a printing plate, and outputs the processed image data through the nodes 14b or 14c, 14d to the image processing apparatus 20. The image processing apparatus 20 converts the supplied image data in accordance with the resolution, the density characteristics, and the screen ruling of the image output device 22, and outputs the converted image data as a halftone-dot signal to the image output device 22. The image output device 22 produces an image based on the halftone-dot signal and outputs the image on a film for thereby making a printing plate.

Figure 1:
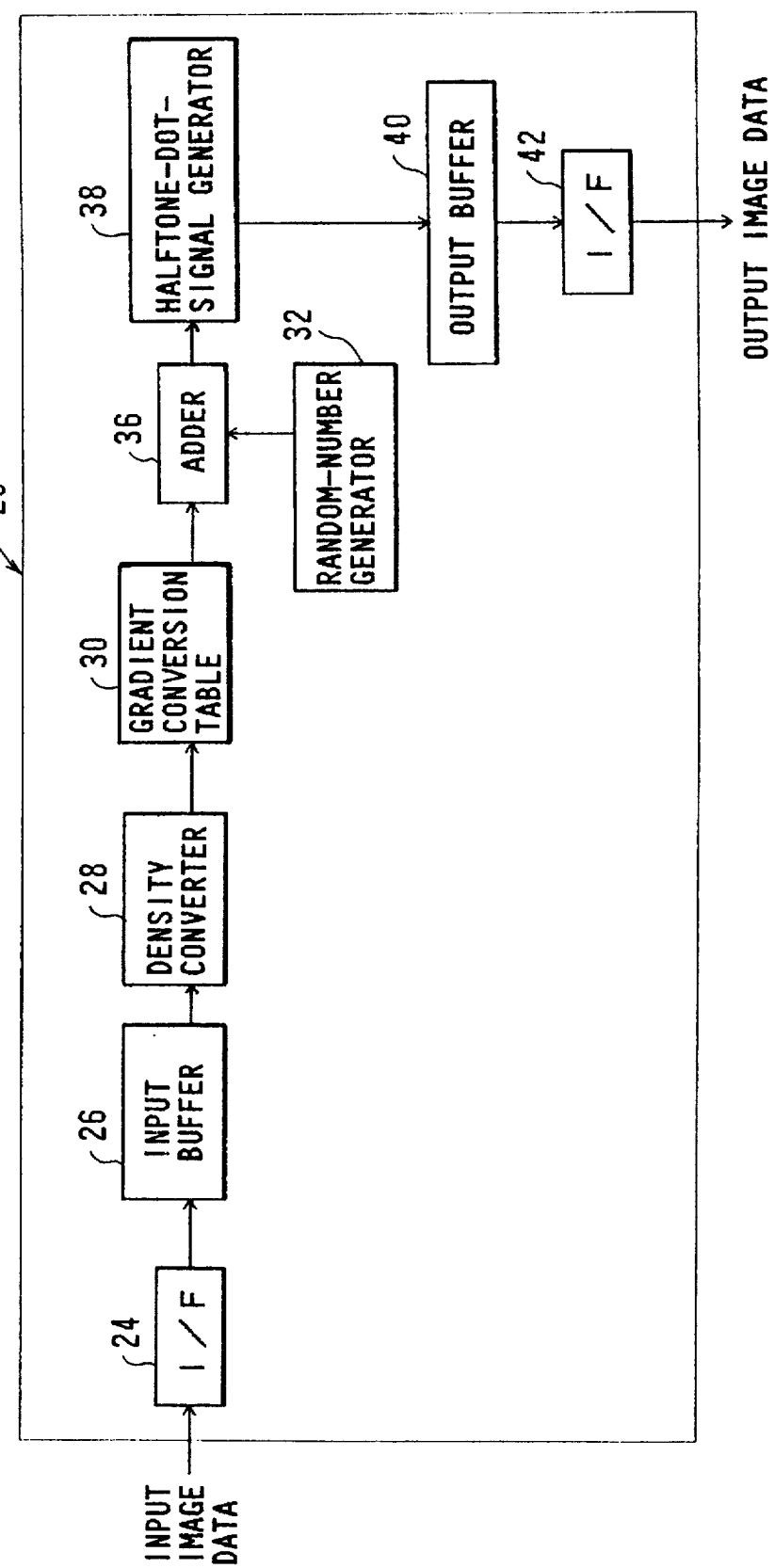
FIG. 1 is a block diagram of an image processing apparatus which incorporates an apparatus for converting the gradient of image data according to the present invention.

The image processing apparatus 20 in the image processing system 10 is shown in detail in FIG. 1. As shown in FIG. 1, the image processing apparatus 20 has an interface 24 for receiving input image data from the node 14d, an input buffer 26 for temporarily storing the input image data that are supplied from the interface 24, a density converter 28 for converting the density of the input image data supplied from the input buffer 26 depending on the resolution of the image output device 22, i.e., the number of pixels recorded per inch, a gradient conversion table 30 (storage means) for converting the input image data from the density converter 28 depending on the output characteristics of the image output device 22, a random-number generator 32 (random-number generating means) for generating random-number data, an adder 36 (processing means) for adding random-number data from the random-number generator 32 to the image data supplied from the gradient conversion table 30 thereby to produce output image data, a halftone-dot-signal generator 38 for generating a halftone-dot-signal based on the output image data supplied from the adder 36, an output buffer 40 for temporarily storing the halftone-dot signal from the halftone-dot-signal generator 38, and an interface 42 for supplying the halftone-dot-signal from the output buffer 40 to the image output device 22. The gradient conversion table 30 comprises a plurality of selectable gradient conversion tables corresponding to different screen rulings, i.e., the different numbers of halftone dots recorded per inch, and different screen angles, i.e., different screen inclinations.

Figure 3:
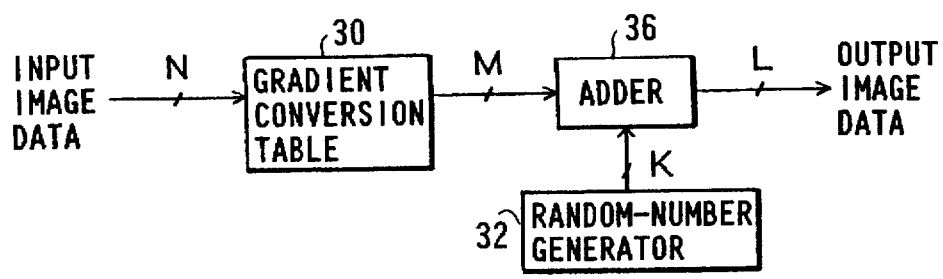
FIG. 3 is a block diagram of a portion of the image processing apparatus illustrated in FIG. 1.
Figure 4:
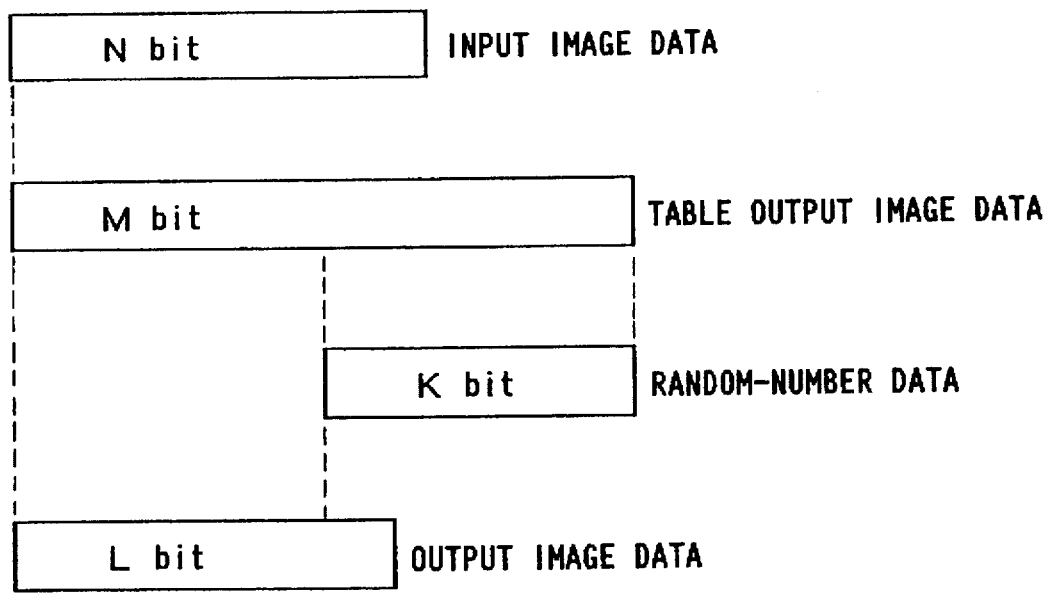
FIG. 4 is a diagram illustrative of a method of converting the gradient of image data according to a first embodiment of the present invention.

In a method of converting the gradient of image data according to a first embodiment of the present invention, as shown in FIGS. 3 and 4, input image data supplied to the gradient conversion table 30 are of N bits, image data outputted from the gradient conversion table 30 are of M bits, the random-number generator 32 outputs K-bit random-number data ($M \geq K$), and the adder 36 adds the random-number data to low-order K bits of the M-bit image data and outputs high-order L bits {L>(M−K)} of the sum as output image data.

Figure 5:
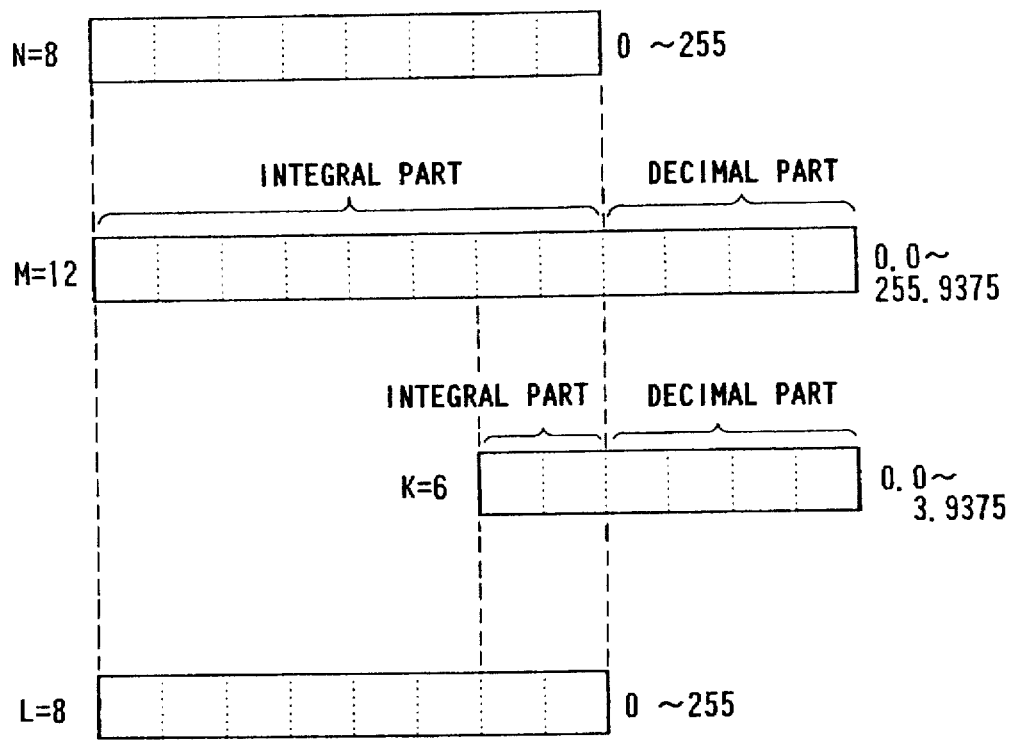
FIG. 5 is a diagram illustrative of the method of converting the gradient of image data according to the first embodiment of the present invention.

The method of converting the gradient of image data according to the first embodiment, which will be carried out by the image processing apparatus 20, will be described below with reference to FIGS. 4 and 5.

Image information of a document or the like which has been read by the image input device 16 is supplied through the nodes 14a–14c to one of the editing workstations 18. The editing workstation 18 processes the supplied image information based on various conditions for making a printing plate, and outputs processed image data through the nodes 14b–14d to the image processing apparatus 20. In the image processing apparatus 20, the supplied image data are sent through the interface 24 to and temporarily stored in the input buffer 26, and are thereafter converted by the density converter 28 to N-bit input image data having a pixel density depending on the resolution of the image output device 22 according to a process such as interpolation.

The N-bit input image data are then converted to M-bit image data depending on the output characteristics of the image output device 22 by the gradient conversion table 30. The M-bit image data from the gradient conversion table 30 are supplied to the adder 36, which adds K-bit random-number data from the random-number generator 32 to low-order K bits of the M-bit image data ($M \geq K$). The adder 36 then outputs high-order L bits {L>(M−K)} of the sum as output image data.

The relationship between the input image data inputted to the gradient conversion table 30 and the output image data outputted from the adder 36 will be described in specific detail below. It is assumed, as shown in FIG. 5, that the input image data are of 8 bits (N=8), the image data outputted from the gradient conversion table 30 are of 12 bits (M=12) including high-order 8 bits as an integral part and low-order 4 bits as a decimal part, the random-number data from the random-number generator 32 are of 6 bits (K=6) including high-order 2 bits as an integral part and low-order 4 bits as a decimal part, and the output image data from the adder 36 are of 8 bits (L=8). It is clear from FIG. 5 that the integer part of the K-bit random number data directly operates on a portion (i.e., in this embodiment, 2 bits) of the M-bit image data to generate at least a portion of the extracted L-bits (i.e., in this embodiment, the lowest two bits of the extracted L-bits). The 8-bit input image data are represented in a range of density steps from 0 to 255, the 12-bit image data in a gradient range from 0.0 to 255.9375, the 6-bit random-number data in a gradient range from 0.0 to 3.9375, and the 8-bit output image data in a gradient range from 0 to 255.

Now, if the input image data are converted to image data having a gradient range of 100.5 by the gradient conversion table 30, then when the random-number data in the gradient range from 0.0 to 3.9375 are added to the image data from the gradient conversion table 30 by the adder 36, the adder 36 produces random sum image data in a gradient range from 100.5 to 104.4375. When high-order 8 bits of the sum image data from the adder 36 are outputted as output image data, the decimal part of the image data is omitted, and the output image data have a gradient range of 100, 101, 102, 103, 104. When a number of such output image data are produced, the adder 36 generates average output image data having a gradient range of 102.0. If the density steps conversion table 30 is arranged such that the gradient range of its output image data is reduced by 1.5 in view of the average gradient range (=2.0) of the random-number data and the average gradient range (=−0.5) of the omitted image data, then the average gradient range of the output image data may be 100.5.

The output image data thus produced are supplied to the halftone-dot-signal generator 38, which converts the supplied image data to halftone-dot data. The halftone-dot data are temporarily stored in the output buffer 40, and thereafter supplied through the interface 42 to the image output device 22. The image output device 22 records a desired image on a film or the like based on the supplied halftone-dot data.

If the random-number data were of 4 bits composed of a decimal part only as in the conventional example, then the output image data would have a gradient range of 100 and 101 only. Since, however, the random-number data are composed of 2 bits as an integral part and 4 bits as a decimal part, the output image data are produced in a gradient range from 100 to 104. The output image data produced by the method according to the first embodiment are thus composed of a plurality of output image data well dispersed or scattered around the desired output image data. Consequently, any banding contained in the image data is sufficiently diluted or reduced in intensity, allowing a highly smooth image to be produced in areas of close densities.

Figure 6:
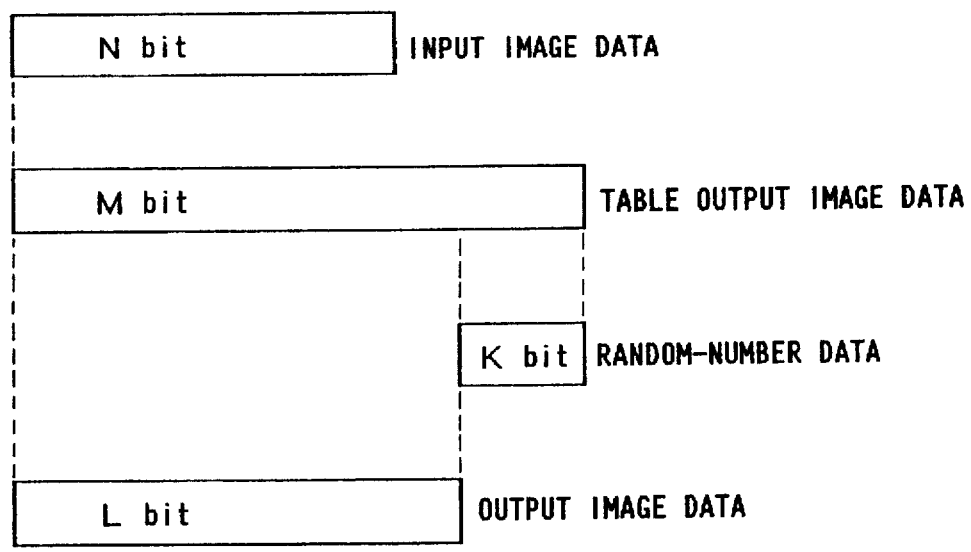
FIG. 6 is a diagram illustrative of a method of converting the gradient of image data according to a second embodiment of the present invention.

In a method of converting the gradient of image data according to a second embodiment of the present invention, as shown in FIGS. 3 and 6, input image data supplied to the gradient conversion table 30 are of N bits having a number of density steps A, image data outputted from the gradient conversion table 30 are of M bits having a number of density steps B, the random-number generator 32 outputs K-bit random-number data (M>K), and the adder 36 adds the random-number data to low-order K bits of the M-bit image data and outputs high-order L bits {L=(M−K)} of the sum as output image data.

The method of converting the gradient of image data according to the second embodiment, which will be carried out by the image processing apparatus 20, will be described below with reference to FIGS. 6 and 7.

N-bit input image data having a number of density steps A, outputted from the density converter 28, are converted by the gradient conversion table 30 to M-bit image data having a number of density steps B (A≠B) depending on the output characteristics of the image output device 22. The M-bit image data from the gradient conversion table 30 are supplied to the adder 36, which adds K-bit random-number data from the random-number generator 32 to low-order K bits of the M-bit image data (M>K). The adder 36 then outputs high-order L bits {L=(M−K)} of the sum as output image data.

The relationship between the input image data inputted to the gradient conversion table 30 and the output image data outputted from the adder 36 will be described in specific detail below. If the image output device 22 has a resolution of 1,200 dots/inch (dpi) and a screen ruling of 100 lines/inch, then the number of density steps that can be expressed by the image output device 22 is 144.

Figure 7:
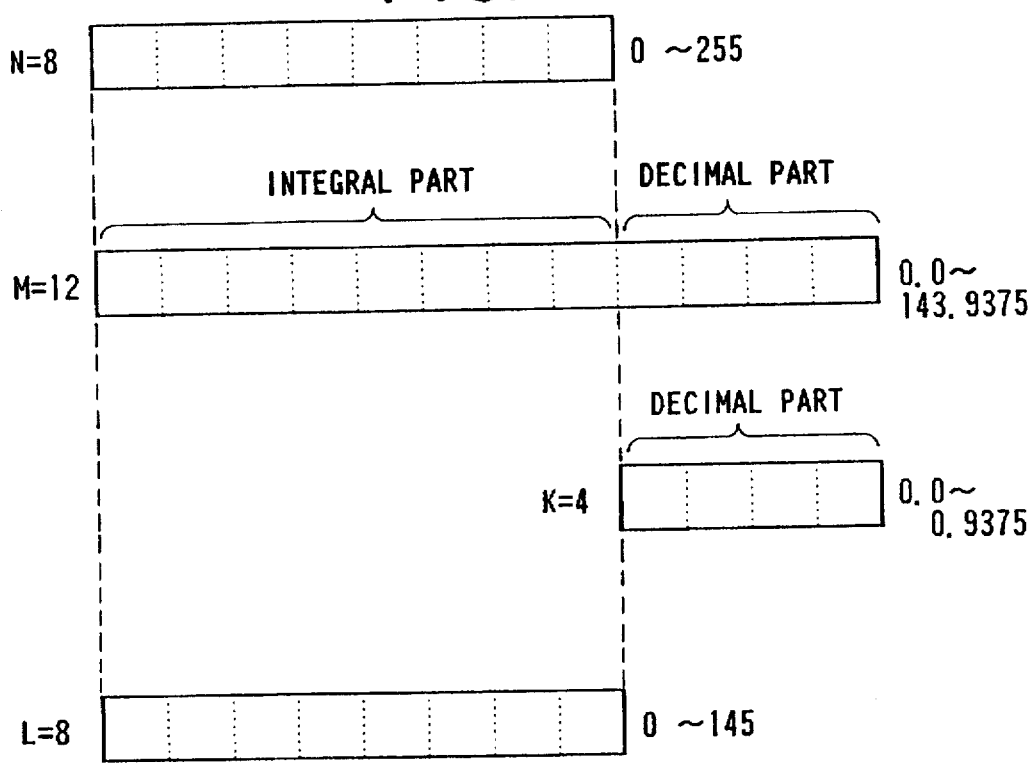
FIG. 7 is a diagram illustrative of the method of converting the gradient of image data according to the second embodiment of the present invention.

It is assumed, as shown in FIG. 7, that the input image data are of 8 bits (N=8) having a density steps of 256 steps (A=256), the image data outputted from the gradient conversion table 30 are of 12 bits (M=12) including high-order 8 bits as an integral part having a density steps of 144 steps (B=144) and low-order 4 bits as a decimal part, the random-number data from the random-number generator 32 are decimal data of 4 bits (K=4), and the output image data from the adder 36 are of 8 bits (L=8) having a density steps of 144 steps (B=144). The 8-bit input image data are represented in a gradient range from 0 to 255, the 12-bit image data in a gradient range from 0.0 to 143.9375, the 4-bit random-number data in a gradient range from 0.0 to 0.9375, and the 8-bit output image data in a gradient range from 0 to 144.

Now, if the input image data are converted to image data having a gradient range of 100.5 by the density steps conversion table 30, then when the random-number data in the gradient range from 0.0 to 0.9375 are added to the image data from the density steps conversion table 30 by the adder 36, the adder 36 produces random sum image data in a gradient range from 100.5 to 101.4375. When high-order 8 bits of the sum image data from the adder 36 are outputted as output image data, the decimal part of the image data is omitted, and the output image data have a gradient range of 100 and 101. The adder 36 generates average output image data having a gradient range of 100.5 which is the same as the gradient range of the image data outputted from the gradient conversion table 30. Inasmuch as an image produced on the basis of the above output image data is expressed virtually in a gradient range of 100.5, any banding is made low in visibility, and the apparent number of density steps that can be expressed by the image output device 22 may be larger than the actual number of density steps B.

Figure 8:
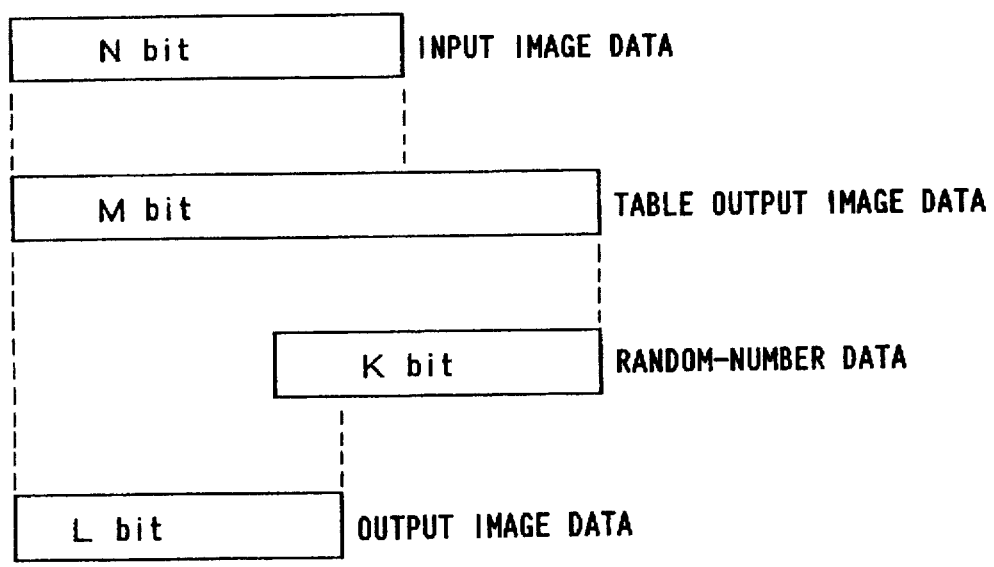
FIG. 8 is a diagram illustrative of a method of converting the gradient of image data according to a third embodiment of the present invention.

A method of converting the gradient of image data according to a third embodiment of the present invention will be described below. The method according to the third embodiment is a combination of the methods according to the first and second embodiments. In the method according to the third embodiment, as shown in FIGS. 3 and 8, input image data supplied to the gradient conversion table 30 are of N bits having a number of density steps A, image data outputted from the gradient conversion table 30 are of M bits having a number of density steps B, the random-number generator 32 outputs K-bit random-number data (M≧K), and the adder 36 adds the random-number data to low-order K bits of the M-bit image data and outputs high-order L bits {L>(M−K)} of the sum as output image data.

The method of converting the gradient of image data according to the third embodiment, which will be carried out by the image processing apparatus 20, will be described below with reference to FIGS. 8 and 9.

N-bit input image data having a number of density steps A, outputted from the density converter 28, are converted by the gradient conversion table 30 to M-bit image data having a number of density steps B (A≠B) depending on the output characteristics of the image output device 22. The M-bit image data from the gradient conversion table 30 are supplied to the adder 36, which adds K-bit random-number data from the random-number generator 32 to low-order K bits of the M-bit image data (M≧K). The adder 36 then outputs high-order L bits {L>(M−K)} of the sum as output image data.

The relationship between the input image data inputted to the gradient conversion table 30 and the output image data outputted from the adder 36 will be described in specific detail below. If the image output device 22 has a resolution of 2,400 dots/inch (dpi) and a screen ruling of 300 lines/inch, then the number of density steps that can be expressed by the image output device 22 is 64.

Figure 9:
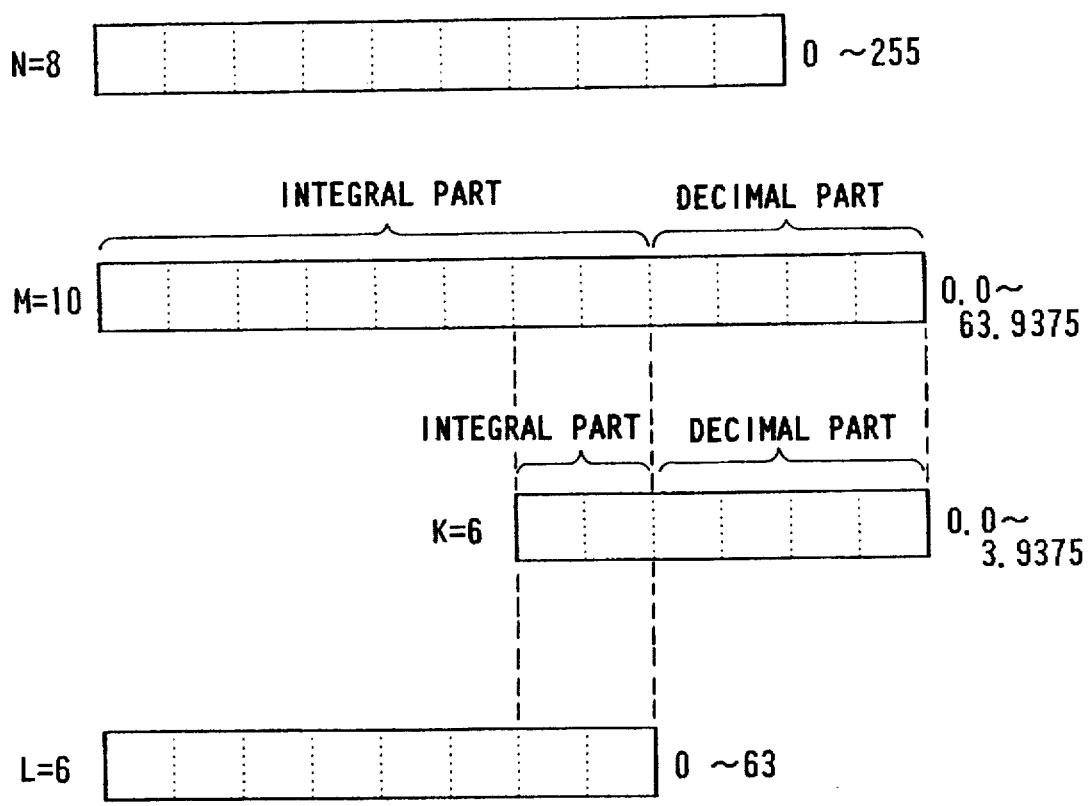
FIG. 9 is a diagram illustrative of the method of converting the gradient of image data according to the third embodiment of the present invention.
Figure 12B:
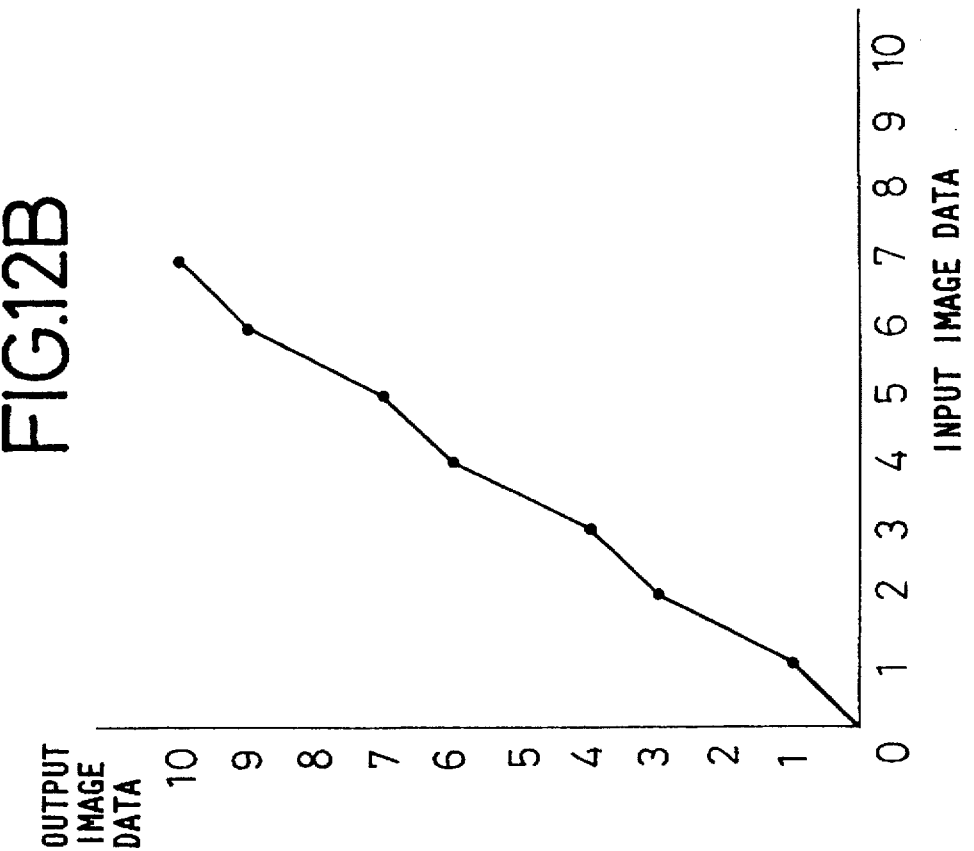
FIGS. 12A and 12B are graphs in which the input and output image data shown in FIGS. 11A and 11B are plotted.
Figure 12A:
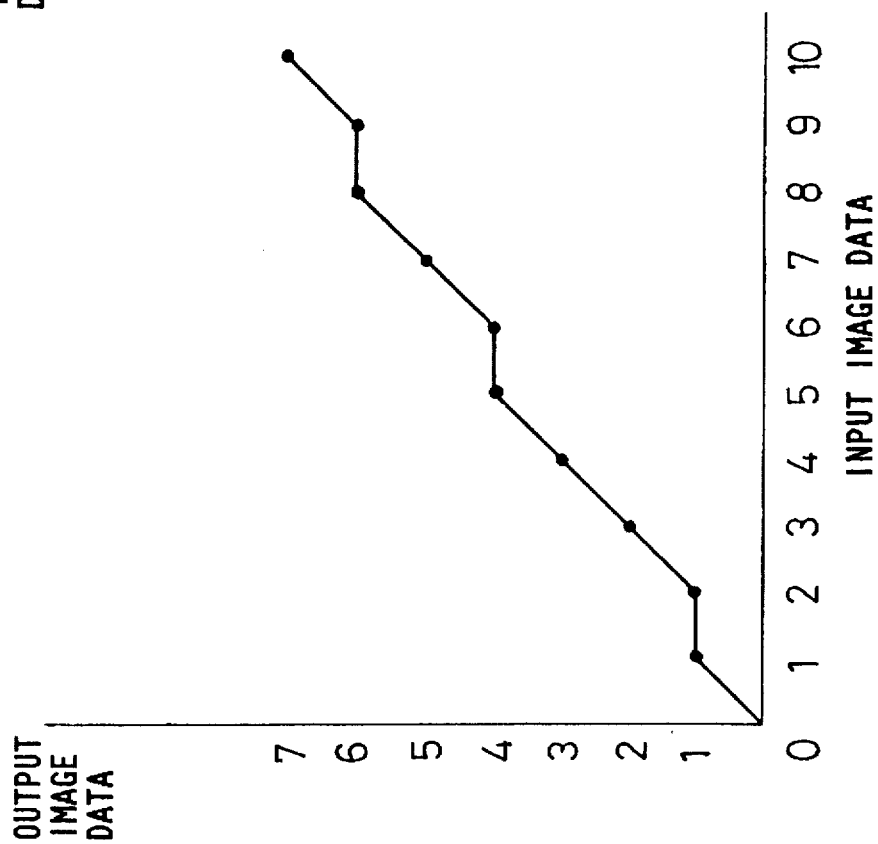

It is assumed, as shown in FIG. 9, that the input image data are of 8 bits (N=8) having a density steps of 256 steps (A=256), the image data outputted from the gradient conversion table 30 are of 10 bits (M=10) including high-order 6 bits as an integral part having a density steps of 64 steps (B=64) and low-order 4 bits as a decimal part, the random-number data from the random-number generator 32 are decimal data of 6 bits (K=6) including high-order 2 bits as an integral part and low-order 4 bits as a decimal part, and the output image data from the adder 36 are of 6 bits (L=6). It is clear from FIG. 9 that the integer part of the K-bit random number data directly operates on a portion (i.e., in this embodiment, 2 bits) of the M-bit image data to generate at least a portion of the extracted L-bits (i.e., in this embodiment, the lowest two bits of the extracted L-bits). The 8-bit input image data are represented in a gradient range from 0 to 255, the 10-bit image data in a gradient range from 0.0 to 63.9375, the 6-bit random-number data in a gradient range from 0.0 to 3.9375, and the 6-bit output image data in a gradient range from 0 to 63.

Now, if the input image data are converted to image data having a gradient range of 50.5 by the gradient conversion table 30, then when the random-number data in the gradient range from 0.0 to 3.9375 are added to the image data from the gradient conversion table 30 by the adder 36, the adder 36 produces random sum image data in a gradient range from 50.5 to 54.4375. When high-order 6 bits of the sum image data from the adder 36 are outputted as output image data, the decimal part of the image data is omitted, and the output image data have a gradient range of 50, 51, 52, 53, 54. The adder 36 generates average output image data having a gradient range of 52. Inasmuch as an image produced on the basis of the above output image data is composed of a plurality of output image data well dispersed or distributed around the desired output image data. Consequently, any banding contained in the image data are sufficiently diluted or reduced in intensity. In addition, the apparent number of density steps that can be expressed by the image output device 22 may be larger than the actual number of density steps B.

While, in the first through third embodiments, the image data outputted from the gradient conversion table 30 and the random-number data are added into output image data by the adder 36, such output image data may be produced using a subtractor, a multiplier, a divider, or the like.

Although certain preferred embodiments of the present invention has been shown and described in detail, it should be understood that various changes and modifications may be made therein without departing from the scope of the appended claims.

What is claimed is:

1. A method of converting the gradient of image data, comprising the steps of:

converting N-bit input image data having a number of density steps A to M-bit image data;

processing said M-bit input data with K-bit random-number data (M≥K) having an integer part to produce image data; and after performing said processing step, extracting high-order L bits {L>(M−K)} of the image data, produced by the processing step, as output image data having a number of density steps A which is equal to the number of density steps A of the input image data, or a number of density steps B which is different from the number of density steps A of the input image data, wherein at least a portion of said extracted L-bits has been generated by said integer part of said K-bit random number data directly operating on a portion of said M-bit image data.

2. An apparatus for converting the gradient of image data, comprising:

storage means for holding a gradient conversion table for converting N-bit input image data having a number of density steps A to M-bit image data;

random-number generating means for generating K-bit random-number data (M≥K) having an integer part;

processing means for processing said M-bit image data with the K-bit random-number data to produce image data; and extracting means for extracting high-order L bits {L>(M−K)} of the image data, produced by said processing means, as output image data having a number of density steps A which is equal to the number of density steps A of the input image data, or a number of density steps B which is different from the number of density steps A of the input image data, wherein at least a portion of said extracted L-bits has been generated by said integer part of said K-bit random number data directly operating on a portion of said M-bit image data.

3. A method of converting the gradient of image data, comprising the steps of:

converting N-bit input image data having a number of density steps A to M-bit image data;

processing said M-bit input data with K-bit random-number data (M>K) having no integer part to produce image data; and after performing said processing step, extracting high-order L bits {L=(M−K)} of the image data, produced by the processing step, as output image data having a number of density steps B which is different from the number of density steps A of the input image data.

4. An apparatus for converting the gradient of image data, comprising:

storage means for holding a gradient conversion table for converting N-bit input image data having a number of density steps A to M-bit image data;

random-number generating means for generating K-bit random-number data (M>K) having no integer part;

processing means for processing said M-bit image data with the K-bit random-number data to produce image data; and extracting means for extracting high-order L bits {L=(M−K)} of the image data, produced by said processing means, as output image data having a number of density steps B which is different from the number of density steps A of the input image data.

5. A method of converting the gradient of image data, comprising the steps of:

converting N-bit input image data having a number of density steps A to M-bit image data;

processing said M-bit image data with K-bit random-number data (M≥K) having an integer part to produce image data; and after performing said processing step, extracting high-order L-bits {L>(M−K)} of the image data, produced by said processing step, as output image having a number of density steps B which is different from the number of density steps A of the input image data, wherein at least a portion of said extracted L-bits has been generated by said integer part of said K-bit random number data directly operating on a portion of said M-bit image data.

6. An apparatus for converting the gradient of image data, comprising:

storage means for holding a gradient conversion table for converting N-bit input image data having a number of density steps A to M-bit image data;

random-number generating means for generating K-bit random-number data (M≥K) having an integer part;

processing means for processing said M-bit image data with the K-bit random-number data to produce image data; and extracting means for extracting high-order L bits {L>(M−K)} of the image data, produced by said processing means, as output image data having a number of density steps B which is different from the number of density steps A of the input image data, wherein at least a portion of said extracted L-bits has been generated by said integer part of said K-bit random number data directly operating on a portion of said M-bit image data.

7. A method as claimed in claim 1, wherein said processing step processes the entire said M-bit image data with said K-bit random-number data.

8. An apparatus as claimed in claim 2, wherein said processing means processes the entire said M-bit image data with said K-bit random-number data.

9. A method as claimed in claim 3, wherein said processing step processes the entire said M-bit image data with said K-bit random-number data.

10. An apparatus as claimed in claim 4, wherein said processing means processes the entire said M-bit image data with said K-bit random-number data.

11. A method as claimed in claim 5, wherein said processing step processes the entire said M-bit image data with said K-bit random-number data.

12. An apparatus as claimed in claim 6, wherein said processing means processes the entire said M-bit image data with said K-bit random-number data.

13. A method as claimed in claim 7, wherein said processing step comprises the step of adding said M-bit image data and said K-bit random-number data.

14. An apparatus claimed in claim 8, wherein said processing means adds said M-bit image data and said K-bit random-number data.

15. A method as claimed in claim 9, wherein said processing step comprises the step of adding said M-bit image data and said K-bit random-number data.

16. An apparatus claimed in claim 10, wherein said processing means adds said M-bit image data and said K-bit random-number data.

17. A method as claimed in claim 11, wherein said processing step comprises the step of adding said M-bit image data and said K-bit random-number data.

18. An apparatus claimed in claim 12, wherein said processing means adds said M-bit image data and said K-bit random-number data.

19. An apparatus for converting the gradient of image data, comprising:

an input interface which receives input image data;

an input buffer which temporarily stores the input image data output from the input interface;

a density converter which converts, based on a predetermined resolution characteristic, the density of the input image data output from the input buffer and provides density converted image data;

a storage device which stores a gradient conversion table which converts said density converted image data, provided from said density converter and having a number of density steps A, into M-bit image data;

a random-number generator which generates K-bit random-number data ($M \geq K$) having an integer part;

a processor which processes said M-bit image data with the K-bit random-number data to produce image data; and an extracting device which extracts high-order L bits $\{L>(M-K)\}$ of the image data, produced by said processor, as output image data having a number of density steps A which is equal to the number of density steps A of the input image data, or a number of density steps B which is different from the number of density steps A of the input image data, wherein at least a portion of said extracted L-bits has been generated by said integer part of said K-bit random number data directly operating on a portion of said M-bit image data;

a halftone-dot signal generator which generates a halftone-dot signal based on the output image data;

an output buffer which temporarily stores the halftone-dot signal; and an output interface which supplies said halftone-dot signal from said output buffer to an image output device having the predetermined resolution characteristic.

* * * * *